(12) United States Patent
Wilson

(10) Patent No.: US 8,644,994 B2
(45) Date of Patent: Feb. 4, 2014

(54) SPATIAL INFORMATION CORRELATION FOR CONTROL OF AN ENERGY PARK

(76) Inventor: Kitchener Clark Wilson, Santa Barbara, CA (US)

( * ) Notice: Subject to any disclaimer, the term of this patent is extended or adjusted under 35 U.S.C. 154(b) by 582 days.

(21) Appl. No.: 12/927,457

(22) Filed: Nov. 16, 2010

(65) Prior Publication Data

US 2012/0123605 A1    May 17, 2012

(51) Int. Cl.
*G05D 11/00*    (2006.01)
(52) U.S. Cl.
USPC ............................ 700/286; 715/700; 715/762
(58) Field of Classification Search
USPC ........... 700/286, 287, 288, 302; 715/700, 762
See application file for complete search history.

(56) References Cited

U.S. PATENT DOCUMENTS 7,221,988 B2 *    5/2007    Eryurek et al. ............... 700/108
2012/0035887 A1 *    2/2012    Augenbraun et al. ............ 703/1

* cited by examiner

*Primary Examiner* — Sean Schechtman
*Assistant Examiner* — Chad Rapp

(57) ABSTRACT

A spatial correlation system and method is disclosed to infer and anticipate the environmental and other conditions of an energy park from individual energy collector information. Individual collector information is acquired and formatted into a pixelized image according to the spatial location of the collector. Image processing and other spatial correlating algorithms are applied to generate spatially correlated descriptions of the energy park. The descriptions are of the current and anticipated conditions. The collectors are made to respond to the descriptions in order to maximize energy collection, avoid disruptive conditions, and reduce stress loading. The system combines locally acquired collection information in a manner that replaces costly collector instrumentation.

16 Claims, 5 Drawing Sheets

SPATIAL INFORMATION CORRELATION FOR CONTROL OF AN ENERGY PARK

BACKGROUND OF THE INVENTION

This invention relates to the operation, control and coordination of energy collectors within an energy park.

Wind energy collectors, the various flavors of solar and ocean surface energy collectors, as well as ocean current collectors, are generally grouped together in parks that can extend many hundreds of square miles, or cubic miles in the case of current collectors. Currently the individual collectors within these parks function as independent entities and sophisticated and expensive sensors (e.g. wind turbine lidars to sense local wind conditions) are proposed to provide each collector with a detailed sense of its locale in order to improve its response to or to keep itself safe from a changing environment.

The viability of an energy collector is generally measured by its energy cost ($/kW-hr). The hardware and maintenance cost of the collector are driving forces. Greater instrumentation increases hardware and maintenance cost with the argument that the information provided makes for a more efficient collector that avoids damage from its environment. For example, the wind turbine lidar, such as that manufactured by Catch the Wind Inc., claims greater wind speed information for improved turbine control and efficiency, recognition of dangerous wind gusts, and for reduced stress loads.

An image that comes to mind is that of medieval armies having a few expensively armored and highly trained knights mounted on armored war horses, but relying on a multitude of lightly armored and barely trained infantry at ground level having little visibility. The knights can see far and wheel and charge with an overview of the battlefield; the infantry sees almost nothing but senses the battle flow from the actions of neighboring fighters. Only a few knights are afforded, but many infantry.

Accordingly, this invention is a means to build an infantry of energy collectors while avoiding the need for knights. Environmental conditions are generally not isolated to a specific collector but have a larger spatial extent and gradually affect a swath of collectors. Each affected collector responds to and senses its local environment, and a sharing of spatially correlated information among such collectors is informative of the greater park environment and is used to anticipate local conditions without the need for expensive instrumentation.

SUMMARY OF THE INVENTION

This invention in particular focuses on spatially correlating the information delivered by individual energy collectors in a manner that is simple to use and easy to apply and that can minimize the need for expensive instrumentation.

US patent application publication 2007/0124025 by Schram et al. considers a turbine using wind information from upwind turbines. It fails to consider using the information from all turbines including those downwind and sidewind from the turbine. It also does not teach a framework with which all turbine information is processed by spatial correlation.

Accordingly it is an objective of the invention to provide a framework whereby information processing methods are applied to spatially correlate collector information.

Another objective is to provide an individual collector that can be included in the spatially correlated network.

Another objective is to provide an energy park that spatially correlates collector information to minimize cost, maximize energy collection efficiency, avoid disruptive environmental conditions, and reduce stress loading.

DETAILED DESCRIPTION OF THE PREFERRED EMBODIMENTS OF THE INVENTION

Wind turbines generally include a multitude of sensors, and SCADA (Supervisory Control And Data Acquisition) systems are commonly provided to gather turbine data primarily for long-term loading and health evaluation by a central computer. Wind turbines are equipped with sophisticated control systems to keep them oriented into the wind while adjusting the blade pitch and generator load to accommodate changing wind speed and direction. Issues turbines must deal with include blade icing, blade and support tower motion resonance, gear box wear, and wind bursts. On- and off-shore wind parks may cover hundreds of square miles.

Solar energy collectors generally have control systems to track the sun. Thin film photoelectric collectors are often installed without tracking; sun focusing concentrated photovoltaic collectors, Stirling engine heat pumps, and central tower collectors (that focus the sun onto a central location) must track in two dimensions; and solar trough heat collectors must track in one dimension. Along with maximizing energy collection, motion is needed to safe the collectors should strong winds, dust, hail, or other damaging conditions occur. Solar energy parks may cover many tens of square miles.

Ocean wave and ocean current power collectors also need to respond to the environment be it ocean waves or currents or wind.

The fundamental concept of this invention is to consider each collector to be a pixel within a 2D or 3D space according to its known location in that space, and assign its information to the intensity of the pixel. Given such a presentation, the plethora of image processing algorithms come to bear to process the data and uncover spatial correlations. These spatial correlations are used to alert collectors as needed to adapt to existing or anticipated conditions.

The information includes information gathered from sensor measurements and information determined or inferred by the collector internal processes.

Figure 1:
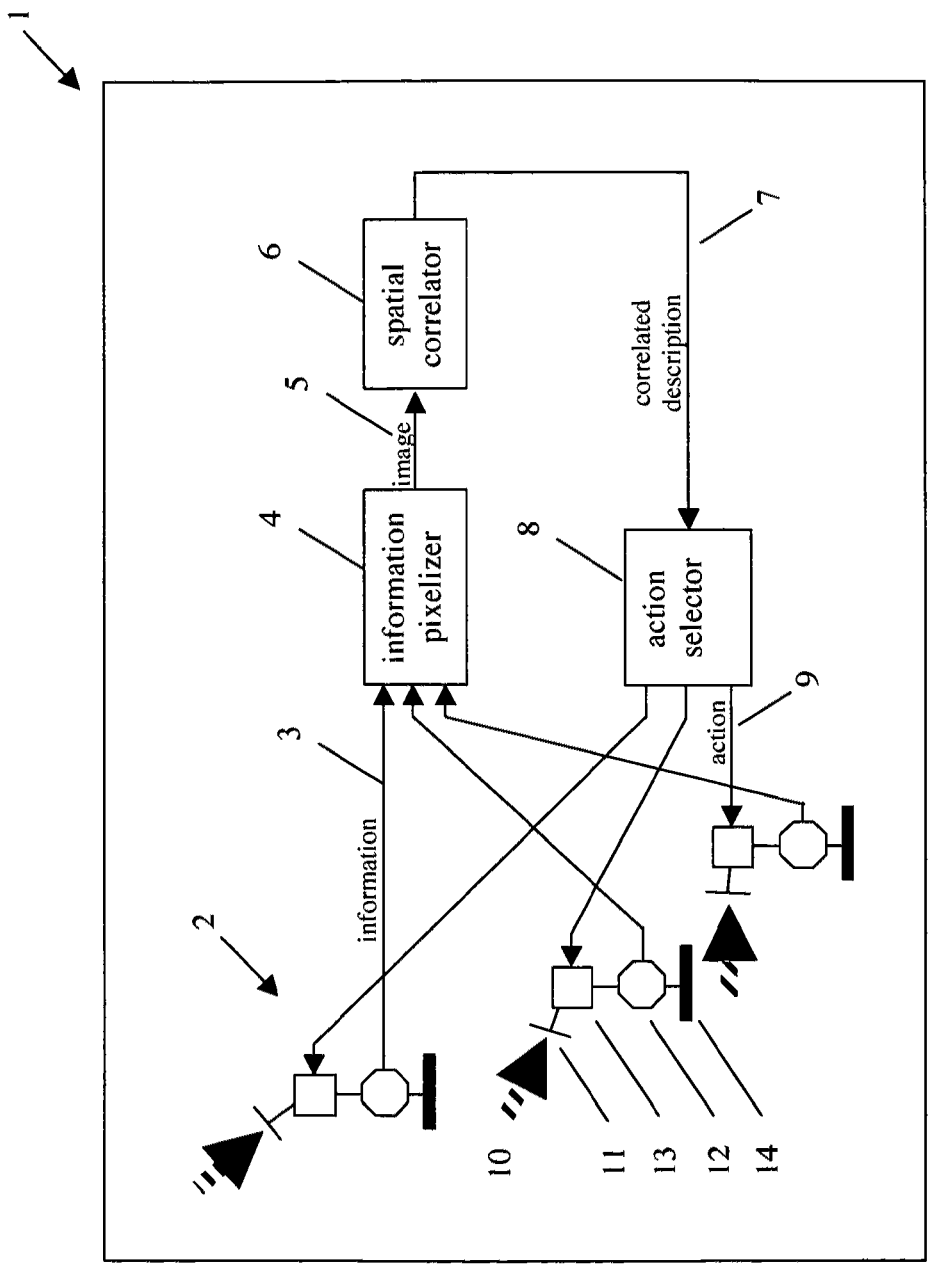
FIG. 1 is a is a schematic representation of a wind energy park showing the energy source, the energy collectors, the information pixelizer, spatial correlator, action selector, and the response of the energy collectors to the action selector.

As shown in FIG. 1, the energy park with spatially correlated information 1 includes the energy collectors 2 of the energy park 1 with each producing information 3; an information pixelizer 4 that spatially maps information 3 into a pixel image 5; an image correlator 6 that produces spatially correlated descriptions 7 of the image 5; and an action selector 8 that responds to the correlated descriptions 7 to produce actions 9 for the energy collectors 2 to respond to using their action mechanisms 13.

An energy collector 2 includes the energy source 10, an energy capture mechanism 11, an information generator 12 producing information 3, an action mechanism 13 responsive to the action 9; and a base 14 that defines the spatial location of the collector 2.

The spatial correlation methods include any conventional image processing algorithms such as smoothing, edge detection algorithms as in the following example taken from wind turbines.

EXAMPLE

Wind Park Having Turbine Spatially Correlation Information

Wind 10 is, of course, an important wind turbine 2 condition. Most wind turbines have an anemometer 12 mounted on their nacelle to directly measure wind speed, and may also use wind speed estimator algorithms (Holley U.S. Pat. No. 5,155,375, Holley U.S. Pat. No. 5,289,041 and Wilson U.S. Pat. No. 7,317,260) that infer wind speed. For simplicity, consider an array of 400 turbines 2 located at the intersections of a square grid of a square wind park 1. The turbines are arranged in twenty rows and columns with known spatial locations.

Figure 2:
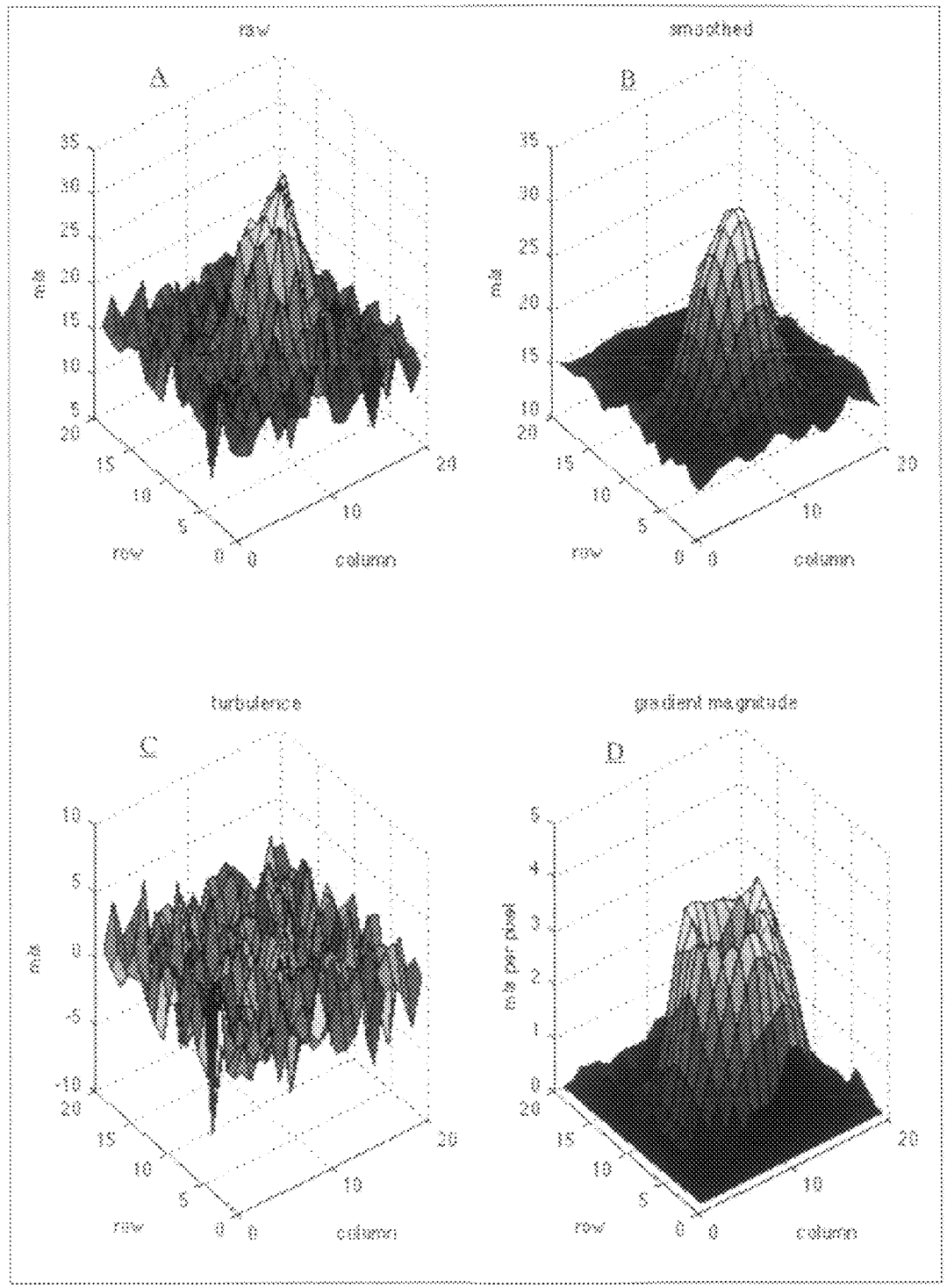
FIG. 2 is pictorial representation of A) simulated raw wind speed across a wind park as reported by the individual wind turbines, B) spatially smoothed values, C) estimated turbulence, D) magnitude of the spatial gradient of wind speed.

FIG. 2A is a pixelized 4 image 5 of turbine 2 wind speeds reported 3 by each turbine 2, and where the pixels are positioned according to the spatial locations of the turbines with winds speed assigned as the pixel intensity. In this example, the wind is simulated as a 14 m/s nominal wind with 2 m/s 1-σ Gaussian turbulence superimposed on a 20 m/s gust. The gust is simply modeled as being centered at row 8 and column 10 and decreasing exponentially with distance from that point.

An example of the actions of a spatial correlator 6 is the conventional image processing averaging mask

| 1/9 | 1/9 | 1/9 |
| 1/9 | 1/9 | 1/9 |
| 1/9 | 1/9 | 1/9 | that averages all the immediate neighbors of a pixel and is used to smooth an image 5. A simple convolution of this mask with the raw image 5 of FIG. 2A generates the smoothed and spatially correlated image of FIG. 2B, clearly showing the gust.

Convolving an image with a mask is a simple task. It means to place the mask over a portion of the image, multiply each of the underlying image pixel intensities by the overlying mask pixel intensity, adding the products and making that the intensity of the new image pixel under the center pixel of the mask, and moving the mask one pixel until the entire image is so processed.

Figure 3:
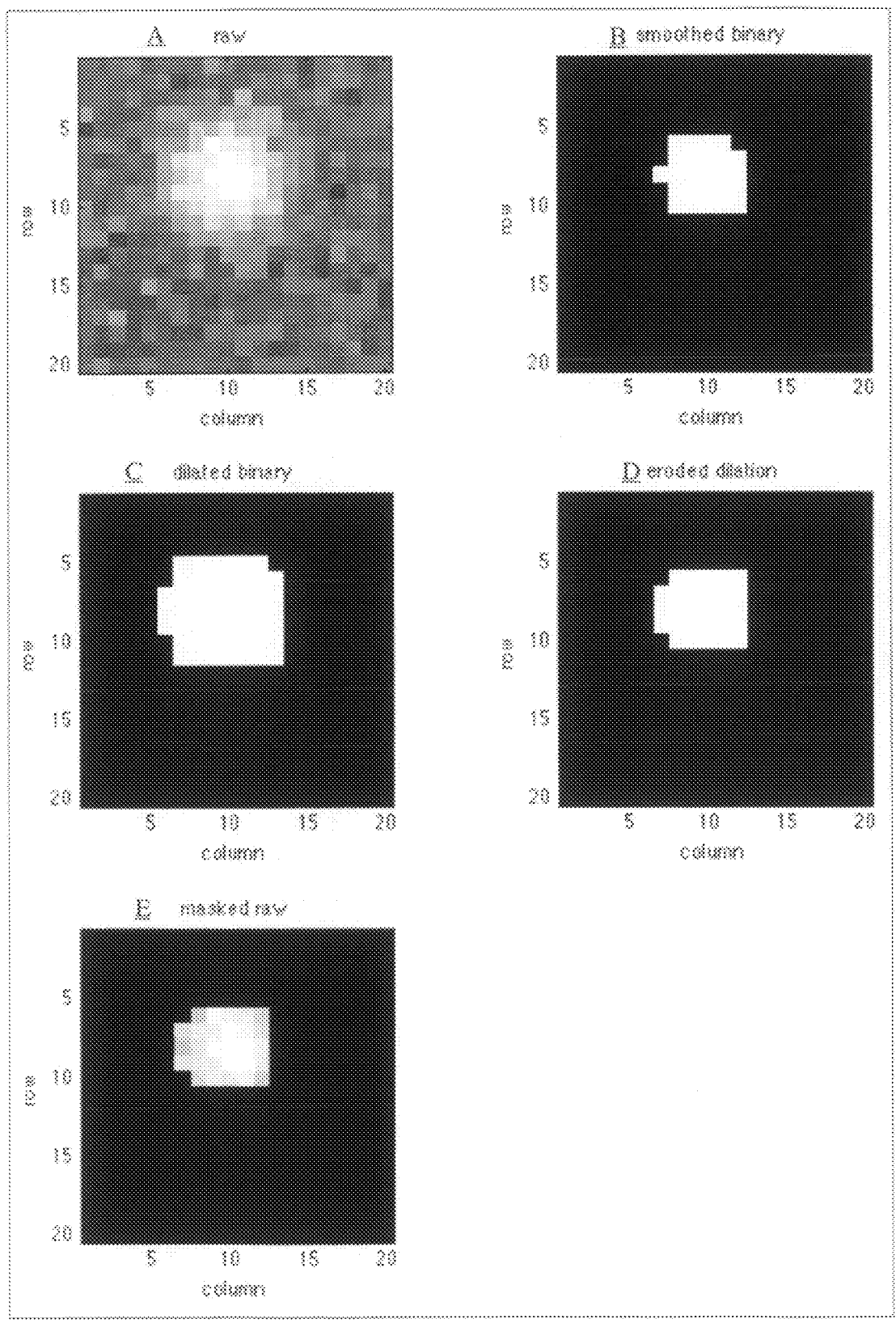
FIG. 3 is a pictorial representation of A) the 2D formatted simulated raw wind speed across a wind park as reported by the individual wind turbines, B) a binary mask of the spatially smoothed values, C) a dilated version of the binary mask (B) to fill in holes and rough edges, D) an eroded version of the dilated mask (C), E) the raw image (A) ANDed with the eroded mask (D).

A binary mask of the smoothed image is formed by setting a value above which the wind speed is considered dangerous. Choosing a 25 m/s setting, a binary mask is formed by assigning a zero value to the pixels with smoothed magnitude less than this and +1 for those greater or equal to this. In 2D format, FIG. 3A shows the raw data 5, and FIG. 3B shows the resulting binary mask. This binary mask may have holes or rough edges, and these are filled in using the dilation (FIG. 3C) followed by the erosion (FIG. 3D) image processing algorithms.

The final eroded binary mask (FIG. 3D) is used as the spatially correlated description 7, and the action selector 8 detects the turbines 2 endangered by the wind gust as those within the eroded binary mask +1 region and issues an action 9 to feather 13 their blades.

Differencing the smoothed from the raw, FIG. 2C represents the random turbulence seen across the wind park and is another type of spatial description 7. The action selector 8 includes an action 9 to feather 13 a turbine's 2 blade pitch in light of excessive turbulence.

FIG. 2D shows a spatially correlated gradient image created by convolving the row and column Sobel masks with the smoothed image of FIG. 2B to find where the wind speed is changing. This is a spatial gradient reflecting the rate with which wind speed is changing over distance (inter-pixel): a value of +1 means the wind speed slope is 1 m/s per pixel (turbine) spacing. The two Sobel Masks are the row differencing mask

| 1/8 | 0 | -1/8 |
| 2/8 | 0 | -2/8 |
| 1/8 | 0 | -1/8 | and the column differencing mask

| 1/8 | 2/8 | 1/8 |
| 0 | 0 | 0 |
| -1/8 | -2/8 | -1/8 | with the gradient magnitude being the square root of the sum of the squares produced by each of these masks convolved with the smoothed image. The gradient magnitude plot of FIG. 2D looks like a volcano for this example since the peak of the gust is not changing.

Figure 4:
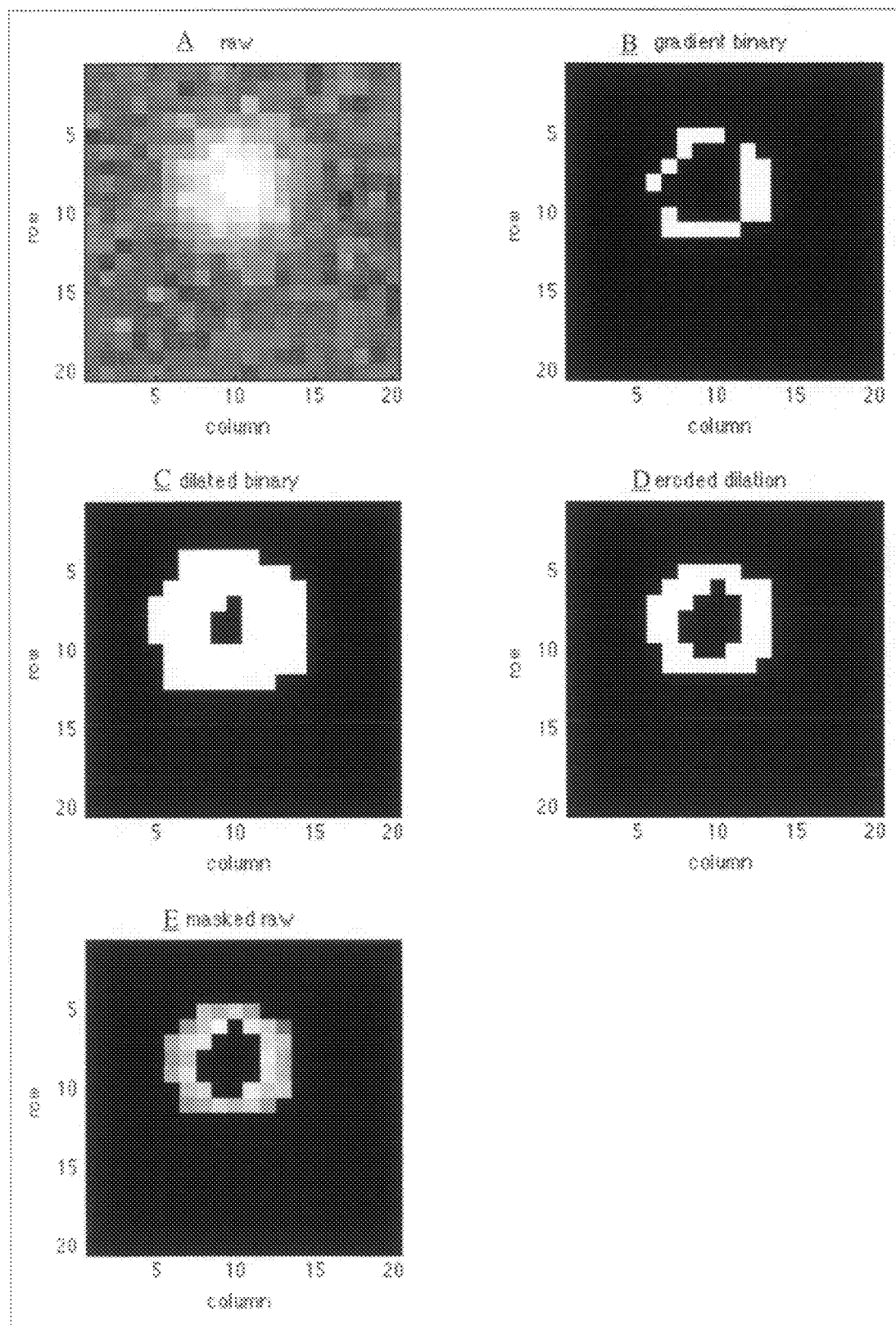
FIG. 4 is a pictorial representation of A) the 2D formatted simulated raw wind speed across wind park, B) a binary mask of the spatial gradient of (A), C) a dilated version of the binary mask (B) to fill in holes and rough edges, D) an eroded version of the dilated mask (C), E) the raw image (A) ANDed with the eroded mask (D).

The leading edge of the gust is found by choosing a value above which a significant gradient is determined (e.g. 3.5 m/s/pixel), forming a binary mask (FIG. 4B) of the gradient of FIG. 2D, and using the dilation (FIG. 4C) and erosion (FIG. 4D) algorithms. A spatial correlator 6 performing these operations outputs 7 the eroded binary mask (FIG. 4D), and the action selector commands 9 the turbines 2 within the mask +1 region to anticipate the arrival of the gust and so alter 13 the blade pitch control parameters.

The action selector 8 also calculates the distance from each turbine to the edge of the gust and determines that the gust is approaching or receding by observing at least two such distances at different times.

Often turbines are not neatly arranged in grids, and this can be accommodated by image processing algorithms that re-sample the uneven data onto an even grid. Re-sampling is commonly performed using multi-dimensional interpolation or using frequency based methods such as the Fourier transform or low-pass filtering.

Multiple gusts in the same image are handled using conventional image processing methods to identify distinct objects (gusts) and connect pixels to each object using well-known connectedness algorithms.

In addition to wind speed, turbine yaw position, blade icing, power generation, and a plurality of other information can be similarly evaluated. Further, once a binary mask of one condition is defined, the binary masks of another conditions can be logically combined (AND, OR, XOR, etc.) to form conditional spatial correlations.

All these and other spatial correlation algorithms are well known and simple and are implemented in an automatic manner that does not require a human operator. Unlike video image processing having mega-pixels, the computational power required is modest given the small number of pixels (turbines) forming a wind park image.

Providing anticipatory indications of changes in the environment, the spatially correlated information allows the effected energy collectors to prepare in advance so as not to be taken by surprise. In the case of wind energy collectors, knowing the imminent arrival of wind from a new direction or with a new speed provides the collector time to alter its wind response by, for example, moving to the new yaw position and changing the pitch and generator control parameters so the response to the new conditions is optimum and so that stress loading is reduced. In this manner the spatially correlated information makes for a more efficient energy park.

Application to Other Energy Collectors

All energy collectors have power cables that feed a station connecting them to the power grid, and it is reasonable to include a communication fiber with these power cables. Wireless communication is another option. Regardless, information can be acquired from each collector, spatially correlated, and the correlated information used to adapt the collector to current or anticipated conditions.

Operational Flow

Figure 5:
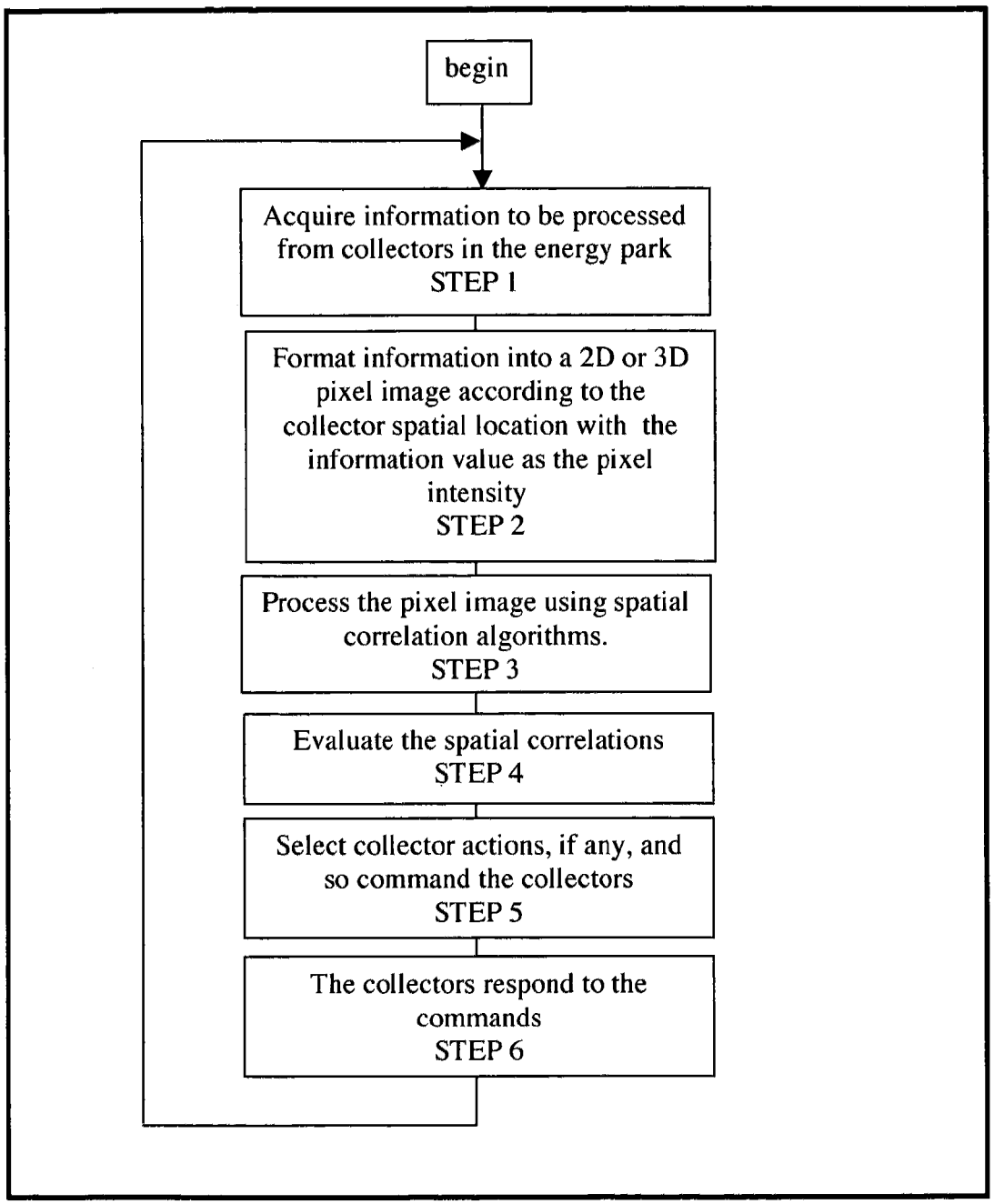
FIG. 5 is a flow chart illustrating the steps used by an energy park having spatially correlated information.

FIG. 5 summarizes the operational flow of a spatial information correlation and control system for wind parks. The algorithm is implemented within each turbine or, in another embodiment, in a central processor. Step 1 acquires, either locally or centrally, the information from turbines in the energy park using the SCADA or other data networks. Step 2 formats the acquired information according to the known collector spatial position into a two-dimensional (or three-dimensional) pixelized image. Step 3 processes the pixel formatted information using suitable spatial correlation algorithms. Step 4 evaluates the algorithm results of Step 3 to determine if a particular energy collector needs to respond in light of the evaluation. Step 5 selects commands to be sent to the collectors and sends them. Step 6 is the response of the energy collectors to the commands followed by a return to Step 1.

OTHER EMBODIMENTS

While several illustrative embodiments of the invention have been shown and described, numerous variations and alternate embodiments will occur to those skilled in the art. For example, energy collector information other than those described are considered, and spatial correlation algorithms different from those presented are considered. Such variations and alternate embodiments, as well as others, are contemplated and can be made without departing from the spirit and scope of the invention as defined in the appended claims.

What is claimed is:

1. An energy park comprising:
    a plurality of energy collectors having known spatial locations where said collectors are adapted to generate collector information;
    a plurality of pixels, comprising a virtual image, where each collector is assigned a pixel positioned within said virtual image in response to the collector known spatial location;
    an information pixelizer adapted to gather said collector information and, for each collector, set the level of the pixel assigned to the collector in response to the collector information;
    a spatial correlator, responsive to said virtual image pixel levels and positions, adapted to use image processing algorithms to form a spatially correlated description of said virtual image;
    an action selector, responsive to said spatially correlated description, adapted to generate an action to be taken by each collector;
    a communicator to communicate said actions to the collectors that are further
    adapted to respond to said actions; and
    where said energy park is controlled in a feedback manner in response to the energy collector information.

2. The energy collectors of claim 1 include at least one of wind turbine energy collectors, solar energy collectors, ocean wave energy collectors, and ocean current energy collectors.

3. The energy collector information of claim 1 include information responsive to collector real-time measurement information, to information generated by collector calculations, or to a combination thereof.

4. The image processing algorithms of claim 1 include at least one of interpolation, re-sampling, smoothing, gradient generation, binary mask generation, binary masking, image dilation, and image erosion.

5. The image processing algorithms of claim 1 include anticipation, trending, or both to predict changes in the correlated description, and said action selector is further responsive to said changes.

6. The actions by the energy collectors of claim 1 include alteration of the energy collection process.

7. The energy park of claim 1 further comprising:
    at least one sensing device, distinct from said energy collectors, generating sensor information;
    said action selector is further adapted to generate actions in response to the sensor information; and
    where said energy park is further controlled in a feedback manner in response to the sensor information.

8. The energy collectors of claim 1 further adapted to include at least one of said pixelizer, spatial correlator, and action selector.

9. A feedback method to control an energy park in response to information generated by a plurality of energy collectors, having known spatial locations and adapted to generate information, including the steps:
    including a plurality of pixels, comprising a virtual image, where each collector is assigned a pixel positioned within said virtual image in response to the collector known spatial location;
    including an information pixelizer adapted to gather said collector information and, for each collector, set the level of the pixel assigned to the collector in response to the collector information;
    including a spatial correlator, responsive to said virtual image pixel levels and positions, adapted to use image processing algorithms to form a spatially correlated description of said virtual image;
    including an action selector, responsive to said spatially correlated description, adapted to generate an action to be taken by each collector; and including a communicator to communicate said actions to the collectors that are further adapted to respond to said actions.

10. The energy collectors of claim 9 include at least one of wind turbine energy collectors, solar energy collectors, ocean wave energy collectors, and ocean current energy collectors.

11. The energy collector information of claim 9 include information responsive to real-time measurement information, to information generated by collector calculations, or to a combination thereof.

12. The image processing algorithms of claim 9 include at least one of interpolation, re-sampling, smoothing, gradient generation, binary mask generation, binary masking, image dilation, and image erosion.

13. The image processing algorithms of claim 9 include anticipation, trending, or both to predict changes in the correlated description, and said action selector is further responsive to said changes.

14. The actions by the energy collectors of claim 9 include alteration of the energy collection process.

15. The method of claim 9 where said energy park further comprises at least one sensing device, distinct from said energy collectors and generating sensor information, further including the step:

further adapting said action selector to generate actions in response to the sensor information, and where said energy park is further controlled in a feedback manner in response to the sensor information.

16. The method of claim 9 further including the step of adapting said energy collectors to include at least one of said pixelizer, spatial correlator, and action selector.

\* \* \* \* \*